A. HARDENBERGH.
HAND TRUCK.
APPLICATION FILED APR. 21, 1913.
1,115,428.
Patented Oct. 27, 1914.
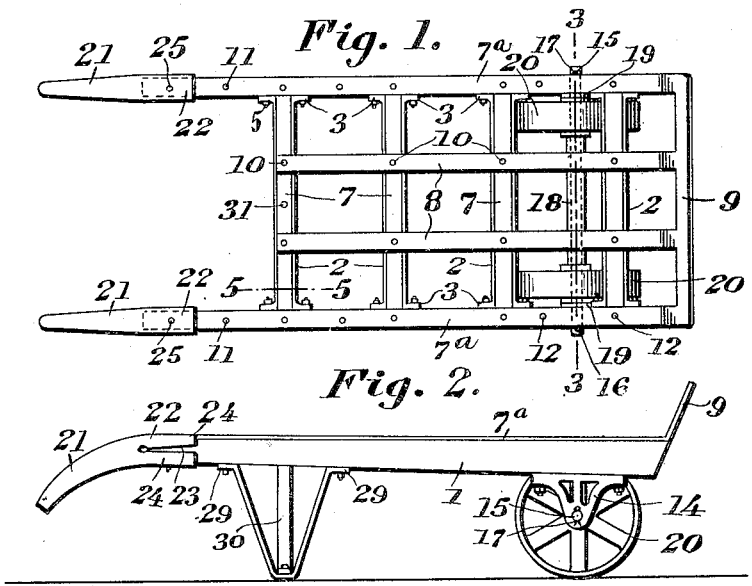
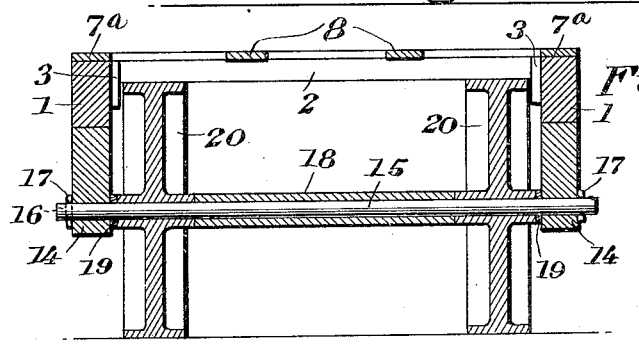
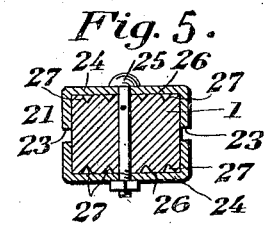
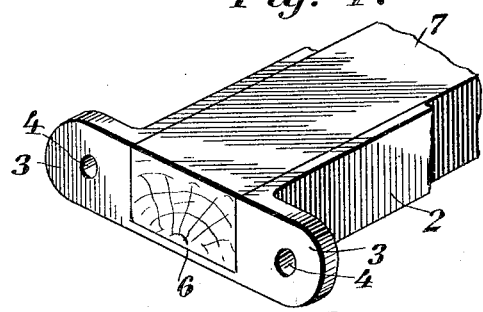
Witnesses:
M. F. Garrett
J. F. Byrne
Inventor
Abner Hardenbergh
By Earle L. Keeler
Attorney
THE NORRIS PETERS CO., PHOTO-LITHO., WASHINGTON, D. C.

UNITED STATES PATENT OFFICE.

ABNER HARDENBERGH, OF DUNKIRK, NEW YORK.

HAND-TRUCK.

1,115,428.  Specification of Letters Patent.  Patented Oct. 27, 1914.

Application filed April 21, 1913. Serial No. 762,549.

*To all whom it may concern:*

Be it known that I, ABNER HARDENBERGH, a citizen of the United States of America, residing at Dunkirk, in the county of Chautauqua and State of New York, have invented certain new and useful Improvements in Hand-Trucks, of which the following is a specification.

This invention relates to hand-trucks; and it has for its objects the provision of a device of this character, which will be made up of parts assembled in such manner as will permit the entire truck to be knocked down if desired; one wherein any particular part when broken or worn may be removed with facility, and a new part substituted therefor at a minimum cost; and one which will be strong, durable, simple and inexpensive in its construction.

A further object of the invention is the provision of a truck wherein any part thereof may be removed when desired without disturbing the companion parts.

A still further object of the invention is the provision of transverse braces between the side bars of the truck and the embodiment therewith of filler members whose ends are in mutual contact with the inner surfaces of the side bars, whereby to prevent the bars from being injured through direct engagement with the ends of the braces.

With these and other objects in view, the invention consists of certain novel features of construction, combination and arrangement of parts, as will be hereinafter described and claimed.

In the accompanying drawings:—Figure 1 is a plan view of the truck; Fig. 2 is a side view thereof; Fig. 3 is a section on line 3—3 of Fig. 1; Fig. 4 is a perspective view of a portion of one of the braces, showing the application of the filler thereto; Fig. 5 is a section on line 5—5 of Fig. 1.

The truck comprises identical side bars 1, which may be constructed of wood or any other suitable well known material; and, as illustrated, each bar is reduced vertically in the direction of its lifting end. Metallic U-braces 2 are interposed between the side bars 1 and provided with upstruck attaching lugs 3 having openings 4 therein to receive therethrough bolts or equivalent fastening devices 5 which may be extended through the side bars 1. In the channel 6 of each of the braces is mounted a filler bar 7, preferably of wood, said bar having its ends terminating flush with the ends of the brace. Each of said channel bars is open at its ends and incident to the fact that the ends of the filler come flush with said open ends of the brace, it is apparent that, through the means of a suitable tool, the filler may be readily driven from the channel by the application of force to the filler from one of the open ends of said brace.

A metallic scooping frame is provided with side branches 7 and intermediate branches 8, the latter being connected with the former by an angularly-disposed foot piece 9 at the front of the truck. The intermediate branches 8 are extended across all of the connected braces 2, being arranged to overlie the filler members $7^a$ of the braces so that removable fastening bolts 10 may be passed through the branches and through the braces 2 and the filler members 7 thereof. The branches 7 are extended rearwardly beyond the ends of the intermediate branches 8 and are arranged to directly overlie the side bars 1, being secured thereto by fastening bolts 11.

The side bars have bolted thereto, as at 12, bearings 14 having mounted therein the ends of an axle forming rod 15. The rod 15 is provided at points beyond the bearings with passages 16 through which cotter pins or equivalent securing devices 17 are removably mounted whereby the axle may be conveniently withdrawn from its bearings when desired. A sleeve 18 in the form of a short pipe section embraces the rod 15 intermediate of the ends thereof and mounted on the rod and confined between the ends of the sleeve 18 and washers 19 are supporting wheels 20.

Through the construction as described any worn part may be removed and a new one substituted therefor without necessitating the removal of other parts of the truck. The construction also furnishes a device wherein its various parts may be knocked-down and arranged in a comparatively compact package for shipment or storage.

Supporting feet 28 are secured to the side bars 1, as at 29, and connected together from the opposite sides of the truck by means of a brace 30, the latter having removable connection at 31 with one of the braces 2.

From the foregoing description, taken in connection with the accompanying drawings, the construction and operation of the invention will be readily understood without requiring a more extended explanation.

Various changes in the form, proportion and the minor details of construction may be resorted to without departing from the principle or sacrificing any of the advantages of this invention as claimed.

Having thus described my invention, what I claim is:—

In a truck structure, a wheeled frame having side bars and connecting channeled braces extending between said side bars, each of said braces being of substantially U-form in transverse section and open at both ends and at its top and provided at each end with a pair of flat alined attaching lugs, means securing said lugs to the adjacent side bars of the frame, filler blocks mounted in the channels of the braces and co-extensive therewith and having their ends lying flush with the said alined ears and resting directly against the inner surfaces of the side bars of the frame and a scooping frame having a foot piece beyond one end of the wheeled frame and having parallel outer branches overlying the side bars, and intermediate branches extending transverse of the braces and crossing all of the fillers and devices extending through the intermediate branches and through the fillers and through the braces thereof.

In testimony whereof I affix my signature in presence of two witnesses.

ABNER HARDENBERGH.

Witnesses:
WALTER REPERT,
C. R. MONROE.

---

Copies of this patent may be obtained for five cents each, by addressing the "Commissioner of Patents, Washington, D. C."